(12) United States Patent
Tsukahara et al.

(10) Patent No.: US 8,723,797 B2
(45) Date of Patent: May 13, 2014

(54) INFORMATION PROCESSING APPARATUS, INFORMATION PROCESSING METHOD, INPUT APPARATUS, AND SENSOR SHEET

(75) Inventors: Tsubasa Tsukahara, Tokyo (JP); Osamu Ito, Tokyo (JP); Shinobu Kuriya, Kanagawa (JP); Tetsuro Goto, Tokyo (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 13/114,358

(22) Filed: May 24, 2011

(65) Prior Publication Data

US 2011/0291939 A1 Dec. 1, 2011

(30) Foreign Application Priority Data

May 31, 2010 (JP) .................................. 2010-123781

(51) Int. Cl.
*G06F 3/02* (2006.01)
(52) U.S. Cl.
USPC ......................................... 345/168; 345/156
(58) Field of Classification Search
None
See application file for complete search history.

(56) References Cited

U.S. PATENT DOCUMENTS

2008/0074295 A1* 3/2008 Fyke ................................ 341/33
2010/0253629 A1* 10/2010 Orsley ........................... 345/168
2011/0175813 A1* 7/2011 Sarwar et al. ................. 345/168

FOREIGN PATENT DOCUMENTS

JP 2004-535712 11/2004
JP 2010-050618 3/2010

* cited by examiner

*Primary Examiner* — Joseph Haley
*Assistant Examiner* — Ifedayo Iluyomade
(74) *Attorney, Agent, or Firm* — Wolf, Greenfield & Sacks, P.C.

(57) ABSTRACT

An information processing apparatus includes: a key array having a key layout in which rows of input keys parallel to a first direction are arranged in a second direction orthogonal to the first direction and the input keys belonging to one row are shifted in the first direction to the input keys belonging to another row; first wiring electrodes routed between the input keys at intervals in the first direction and each having a capacitance changed by proximity of a detection target; second wiring electrodes routed along the first direction to thread through the rows and each having the capacitance; and a control unit to generate a control signal including a first signal on a position of the detection target along the first direction based on the capacitances of the first and second wiring electrodes and a shift amount of the input keys in each row in the first direction.

14 Claims, 15 Drawing Sheets

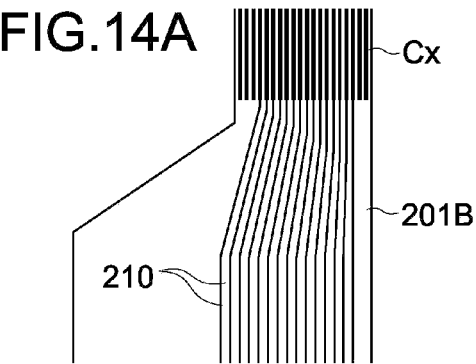 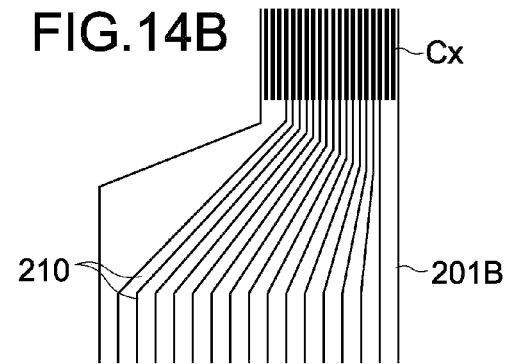
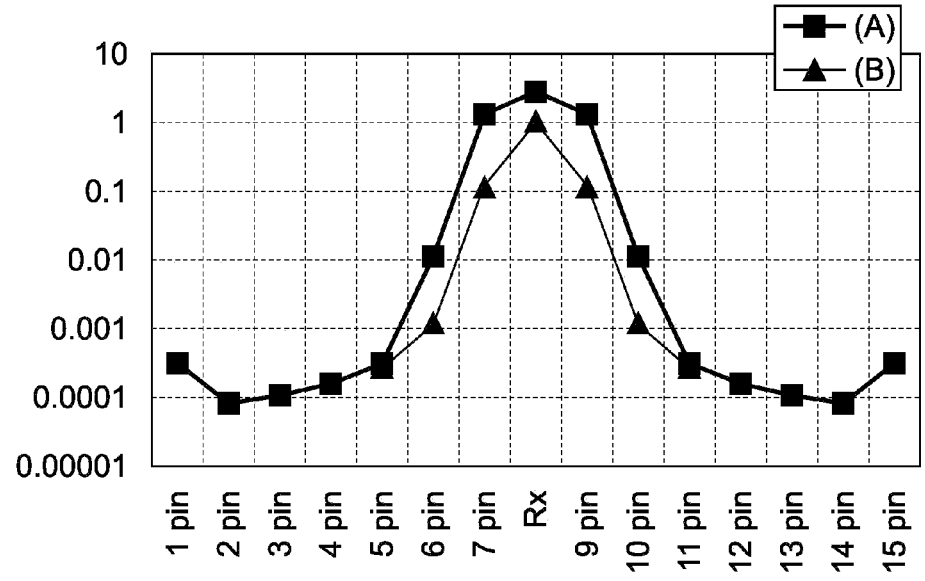
FIG.15

INFORMATION PROCESSING APPARATUS, INFORMATION PROCESSING METHOD, INPUT APPARATUS, AND SENSOR SHEET

CROSS REFERENCE TO RELATED APPLICATIONS

This application claims priority under 35 U.S.C. §119 to Japanese Priority Patent Application JP 2010-123781, filed in the Japan Patent Office on May 31, 2010, the entire content of which is hereby incorporated by reference.

BACKGROUND OF THE INVENTION

1. Field of the Invention

The present invention relates to an information processing apparatus, an information processing method, an input apparatus, and a sensor sheet that are used in combination with a plurality of input keys two-dimensionally arranged and are capable of electrostatically detecting the proximity of a detection target.

2. Description of the Related Art

In flat information display apparatuses using liquid crystal display devices, in general, the contact of a finger or the like on a display panel surface is detected with a touch sensor, and a display image or an operation is controlled based on coordinate information of that contact position. Further, in recent years, there is proposed an information display apparatus capable of detecting not only a contact state but also a proximity state before a finger or the like touches a touch sensor. For example, Japanese patent application Laid-open No. 2008-117371 discloses a method of changing an inter-electrode distance between detection electrodes in accordance with a facing distance between a sensor means constituted of a plurality of detection electrodes and a target and adjusting a detection resolution.

SUMMARY OF THE INVENTION

Incidentally, it is conceived that the sensor means is incorporated into a keyboard of a personal computer to move a pointer on a display screen by the movement of a hand and finger on the keyboard. In this case, a plurality of detection electrodes are arranged in a matrix as if to thread through input keys.

However, in order to improve the convenience of input operability and because of the mixture of input keys different in shape, the keyboard of this type does not have a key layout in which keys are arranged in a matrix, and has an arrangement mode in which some of the input keys are shifted in the lateral direction with respect to other input keys. For that reason, when detection electrodes are intended to be arranged in the longitudinal direction as if to thread through the input keys, it may be impossible to linearly route the detection electrodes in the longitudinal direction, with the result that there may be a case where the position of a target is difficult to be accurately detected.

In view of the circumstances as described above, it is desirable to provide an information processing apparatus, an information processing method, an input apparatus, and a sensor sheet that are capable of accurately detecting a position of a detection target even when input keys are arranged in a non-matrix pattern.

According to an embodiment of the present invention, there is provided an information processing apparatus including a key array, a plurality of first wiring electrodes, a plurality of second wiring electrodes, and a control unit.

The key array has a key layout in which a plurality of rows of input keys parallel to a first direction are arranged in a second direction orthogonal to the first direction and the input keys belonging to one of the rows are arranged to be shifted in the first direction with respect to the input keys belonging to another row.

The plurality of first wiring electrodes are routed between the input keys at intervals in the first direction and each have a capacitance changed by proximity of a detection target.

The plurality of second wiring electrodes are routed along the first direction to thread through the plurality of rows of the input keys and each have a capacitance changed by the proximity of the detection target.

The control unit generates a control signal including a first signal on a position of the detection target along the first direction based on the capacitances of the plurality of first wiring electrodes, the capacitances of the plurality of second wiring electrodes, and a shift amount of the input keys in each of the rows in the first direction.

In the information processing apparatus described above, the first and second wiring electrodes that electrostatically detect the detection target are routed as if to thread through the input keys. Then, the control unit generates the control signal based on the capacitances of the first wiring electrodes, the capacitances of the second wiring electrodes, and the shift amount of the input keys in each row in the first direction. Accordingly, it is possible to detect an accurate position of a detection target that comes close to a position immediately above the plurality of input keys arranged on a two-dimensional plane in a non-matrix pattern.

The plurality of first wiring electrodes may be routed in a third direction that obliquely intersects the first direction and the second direction.

Accordingly, the first wiring electrodes can be routed between the input keys without alternately intersecting each other.

The information processing apparatus may further include a first sheet base material. The first sheet base material is attached to the key array, has a plurality of holes through which the input keys pass, and supports the plurality of first wiring electrodes.

With this structure, when the first sheet base material is attached to the key array, the first wiring electrodes can be accurately positioned at predetermined positions around the input keys.

Each of the plurality of first wiring electrodes may include a first electrode portion and a first wiring portion. The first electrode portion is positioned between the input keys of each row that are adjacent in the first direction. The first wiring portion individually connects the first electrode portions of the respective rows and is routed in the third direction in a wiring width narrower than that of the first electrode portion.

Accordingly, since the influence of a capacitance change in the first wiring portion due to the proximity of the detection target can be made small, the detection accuracy of the position of the detection target along the first direction can be improved.

The control unit may generate the control signal further including a second signal on a position of the detection target along the second direction based on the capacitances of the plurality of second wiring electrodes.

Accordingly, the position of the detection target along the first direction and the second direction can be detected.

The information processing apparatus may further include a second sheet base material. The second sheet base material is attached to the key array, has a plurality of holes through which the input keys pass, and supports the plurality of second wiring electrodes.

With this structure, when the second sheet base material is attached to the key array, the second wiring electrodes can be accurately positioned at predetermined positions around the input keys.

Each of the plurality of second wiring electrodes may include a second electrode portion and a second wiring portion. The second electrode portion is positioned between the input keys of the respective rows that are adjacent in the second direction. The second wiring portion individually connects the second electrode portions belonging to the same row and is routed in the first direction in a wiring width narrower than that of the second electrode portion.

Accordingly, since the influence of a capacitance change in the second wiring portion due to the proximity of the detection target can be made small, the detection accuracy of the position of the detection target along the second direction can be improved.

According to another embodiment of the present invention, there is provided an input apparatus including a key array, a plurality of first wiring electrodes, a plurality of second wiring electrodes, and a control unit.

The key array has a key layout in which a plurality of rows of input keys parallel to a first direction are arranged in a second direction orthogonal to the first direction and the input keys belonging to one of the rows are arranged to be shifted in the first direction with respect to the input keys belonging to another row.

The plurality of first wiring electrodes are routed between the input keys at intervals in the first direction and each have a capacitance changed by proximity of a detection target.

The plurality of second wiring electrodes are routed along the first direction to thread through the plurality of rows of the input keys and each have a capacitance changed by the proximity of the detection target.

The control unit generates a control signal used for controlling a movement of an image along the first direction, the image being displayed on a display screen, based on the capacitances of the plurality of first wiring electrodes, the capacitances of the plurality of second wiring electrodes, and a shift amount of the input keys in each of the rows in the first direction.

In the input apparatus, the first and second wiring electrodes that electrostatically detect the detection target are routed as if to thread through the input keys. Then, the control unit generates the control signal based on the capacitances of the first wiring electrodes, the capacitances of the second wiring electrodes, and the shift amount of the input keys in each row in the first direction. Accordingly, it is possible to detect an accurate position of a detection target that comes close to a position immediately above the plurality of input keys arranged on a two-dimensional plane in a non-matrix pattern, and perform highly accurate movement control of an image based on the movement of the detection target.

According to another embodiment of the present invention, there is provided an information processing method including detecting a capacitance of each of a plurality of first wiring electrodes. The plurality of first wiring electrodes are arranged on a key array. The key array has a key layout in which a plurality of rows of input keys parallel to a first direction are arranged in a second direction orthogonal to the first direction and the input keys belonging to one of the rows are arranged to be shifted in the first direction with respect to the input keys belonging to another row. The plurality of first wiring electrodes are routed between the input keys at intervals in the first direction.

A capacitance of each of a plurality of second wiring electrodes is detected, the plurality of second wiring electrodes being arranged on the key array and routed between the plurality of rows of the input keys.

A control signal including a first signal on a position of a detection target along the first direction is generated based on the capacitances of the plurality of first wiring electrodes, the capacitances of the plurality of second wiring electrodes, and a shift amount of the input keys in each of the rows in the first direction.

According to another embodiment of the present invention, there is provided a sensor sheet including a sheet base material, a plurality of wiring electrodes, and a connection terminal.

The sheet base material is attached to a key array. The key array has a key layout in which a plurality of rows of input keys parallel to a first direction are arranged in a second direction orthogonal to the first direction and the input keys belonging to one of the rows are arranged to be shifted in the first direction with respect to the input keys belonging to another row. The sheet base material includes a plurality of holes formed to correspond to the key layout such that the input keys are individually inserted into the plurality of holes.

The plurality of wiring electrodes are routed between the input keys at intervals in the first direction and each have a capacitance changed by proximity of a detection target.

The connection terminal is attached to the sheet base material and used for connecting the plurality of wiring electrodes to a detection circuit for detecting a capacitance of each of plurality of wiring electrodes.

According to the sensor sheet, when the sheet base material is attached to the key array, the wiring electrodes can be accurately positioned at predetermined positions around the input key. Further, by providing the connection terminal, it is possible to handle the sensor sheet independently of the detection circuit.

According to the embodiments of the present invention, it is possible to detect an accurate position of a detection target that comes close to a position immediately above the plurality of input keys arranged on a two-dimensional plane in a non-matrix pattern.

These and other objects, features and advantages of the present invention will become more apparent in light of the following detailed description of best mode embodiments thereof, as illustrated in the accompanying drawings.

BRIEF DESCRIPTION OF DRAWINGS

FIG. 14 are plan views of a main part of the first sensor sheet for explaining a structural example of the vicinity of a connection terminal;

FIG. 15 is a graph showing a relationship between an arrangement interval of wires connected to the connection terminal and detection characteristics;

DESCRIPTION OF PREFERRED EMBODIMENTS

Hereinafter, an embodiment of the present invention will be described with reference to the drawings.

(Structure of Information Processing Apparatus/Input Apparatus)

Figure 1:
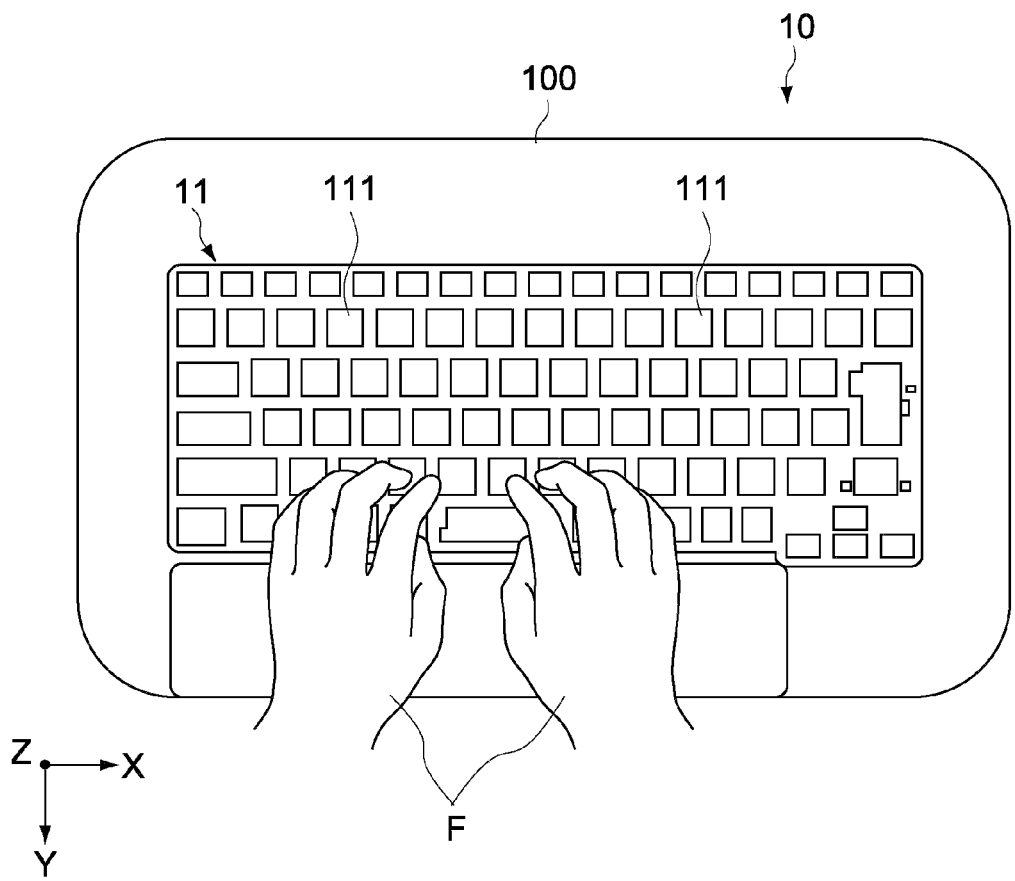
FIG. 1 is a plan view of an input apparatus according to an embodiment of the present invention.

FIG. 1 is a plan view showing a structure of an input apparatus constituting an information processing apparatus according to an embodiment of the present invention. It should be noted that in FIG. 1, an X-axis direction is a lateral direction, a Y-axis direction is a longitudinal direction, and a Z-axis direction is a height direction orthogonal to the X-axis direction and the Y-axis direction.

An input apparatus 10 is formed as a keyboard generally used in a personal computer or the like. The input apparatus 10 includes a casing 100 and a key array 11 including a plurality of input keys 111 formed on the surface of the casing 100.

The input keys 111 are constituted of push-down type operation buttons, on which input operations are made by a finger F of a user. The key array 11 of this embodiment is formed by arranging a plurality of rows of the input keys 111 that are parallel to the lateral direction (X-axis direction) in the longitudinal direction (Y-axis direction), and has a key layout in which the input keys 111 belonging to one row are shifted in the lateral direction with respect to the input keys 111 belonging to another row. A shift amount of the input keys 111 is smaller than an arrangement pitch of the input keys 111 in the lateral direction. As such a key layout, for example, so-called "QWERTY layout", "AZERTY layout", or the like is applied.

Figure 2:
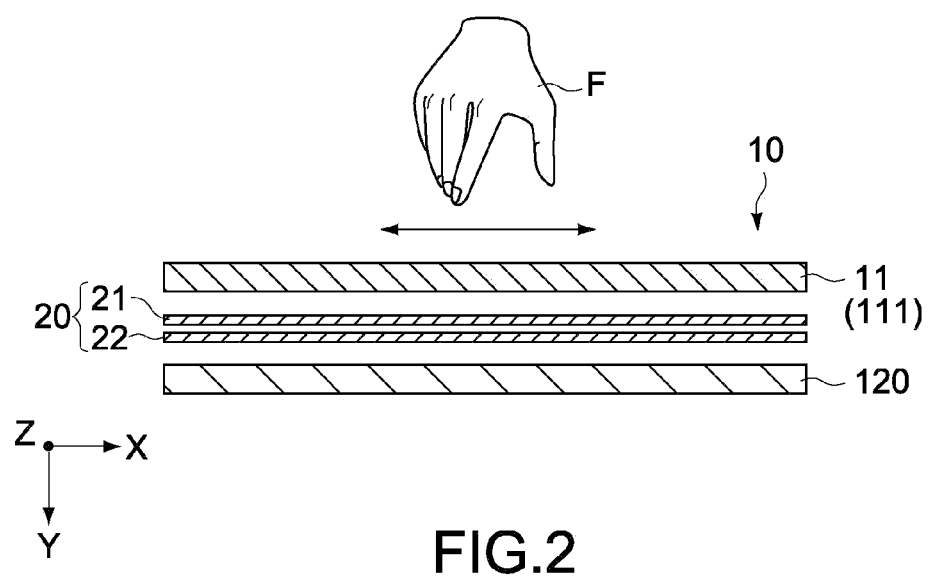
FIG. 2 is a schematic cross-sectional view of the input apparatus.

The input apparatus 10 of this embodiment further includes a sensor sheet group 20 that electrostatically detects the position of a finger F coming close to the key array 11. FIG. 2 is a schematic cross-sectional view of the input apparatus 10, to which the sensor sheet group 20 is attached. The sensor sheet group 20 is disposed on a circuit board 120 that supports the input keys 111 and has contact points with the input keys 111. The circuit board 120 is electrically connected to a control unit (not shown), and outputs an input signal of the input keys 111 on which input operations have been made to the control unit.

(Sensor Sheet)

The sensor sheet group 20 is used for detecting the proximity of the finger F to the key array 11 and a position thereof and is formed as a combination of a first sensor sheet 21 and a second sensor sheet 22. The sensor sheets 21 and 22 each include a plurality of wiring electrodes whose capacitances are changed due to the proximity of a detection target (finger F of user in this embodiment). In this embodiment, the first sensor sheet 21 detects a proximity position of a detection target along the X-axis direction and the second sensor sheet 22 detects a proximity position of the detection target along the Y-axis direction. Hereinafter, the structure of the sensor sheets 21 and 22 will be described.

Figure 3:
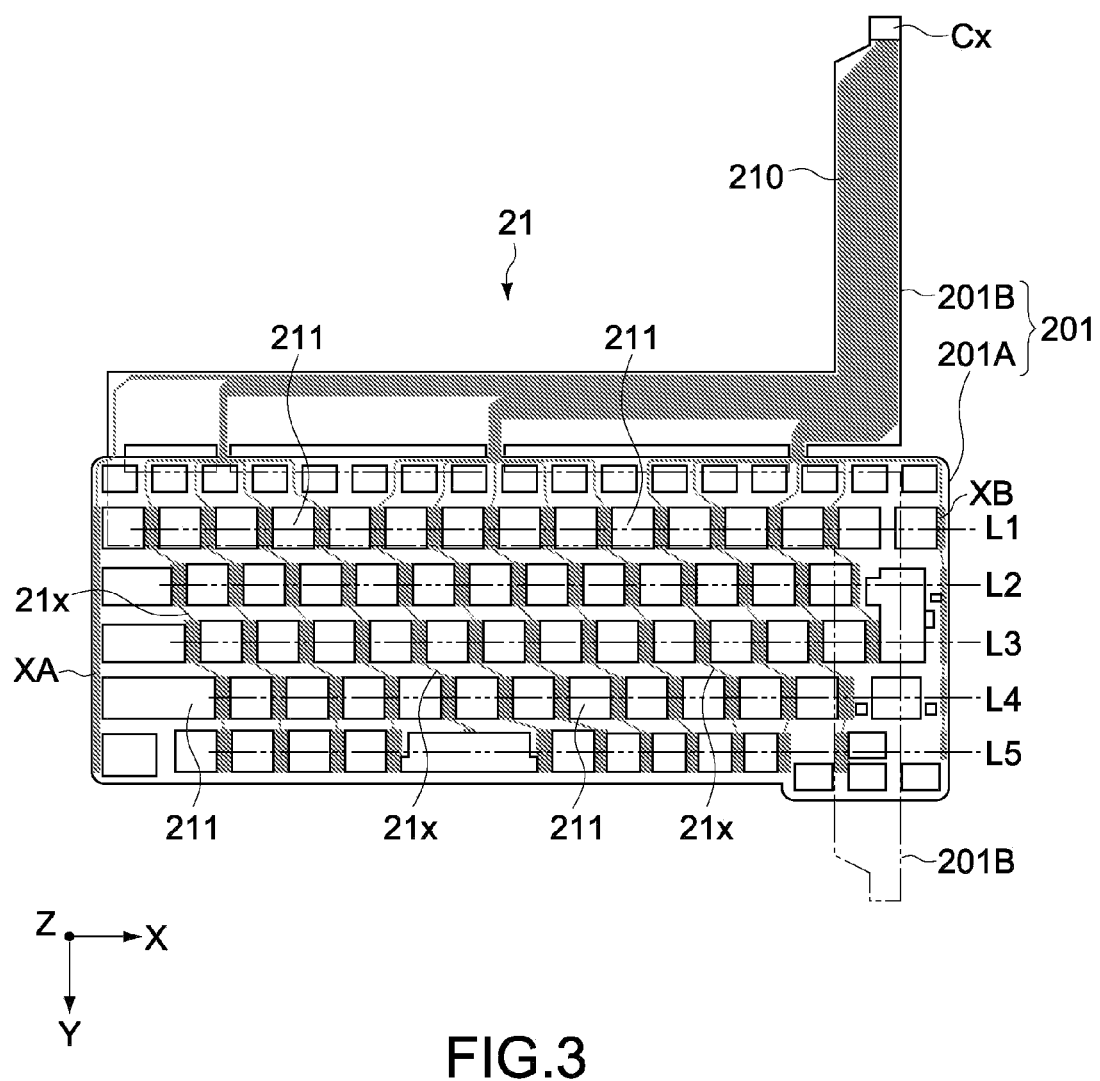
FIG. 3 is a plan view of a first sensor sheet attached to the input apparatus.

FIG. 3 is a plan view showing the structure of the first sensor sheet 21. The sensor sheet 21 includes a first sheet base material 201 having electrical insulation properties and a plurality of first wiring electrodes $21x$ supported by the first sheet base material 201.

The first sheet base material 201 is formed of a resin material such as PET (polyethylene terephthalate), PEN (polyethylene naphthalate), or PC (polycarbonate). The first sheet base material 201 includes a main body portion 201A and a coupling portion 201B. The main body portion 201A includes a plurality of holes 211 corresponding to the key layout of the input keys 111, and the holes 211 are formed such that the input keys 111 can be individually inserted thereinto. The first wiring electrodes $21x$ are routed as if to thread through those holes. On the coupling portion 201B, a plurality of connection wires 210 for connecting the first wiring electrodes $21x$ to a detection circuit (not shown) are formed. When the first sheet base material 201 is fixed inside the casing 100 of the input apparatus 10, the main body portion 201A is provided to the key array 11 and the coupling portion 201B is folded back with respect to the X-axis direction as indicated by a chain double-dashed line in FIG. 3.

The first wiring electrodes $21x$ and the connection wires 210 are each formed of a metal material such as copper, aluminum, or silver. The first wiring electrodes $21x$ and the connection wires 210 may be formed by performing pattern etching on a conductive foil formed on the first sheet base material 201, or may be formed by growing a metal wiring layer on the first sheet base material 201 by a plating method.

Figure 4:
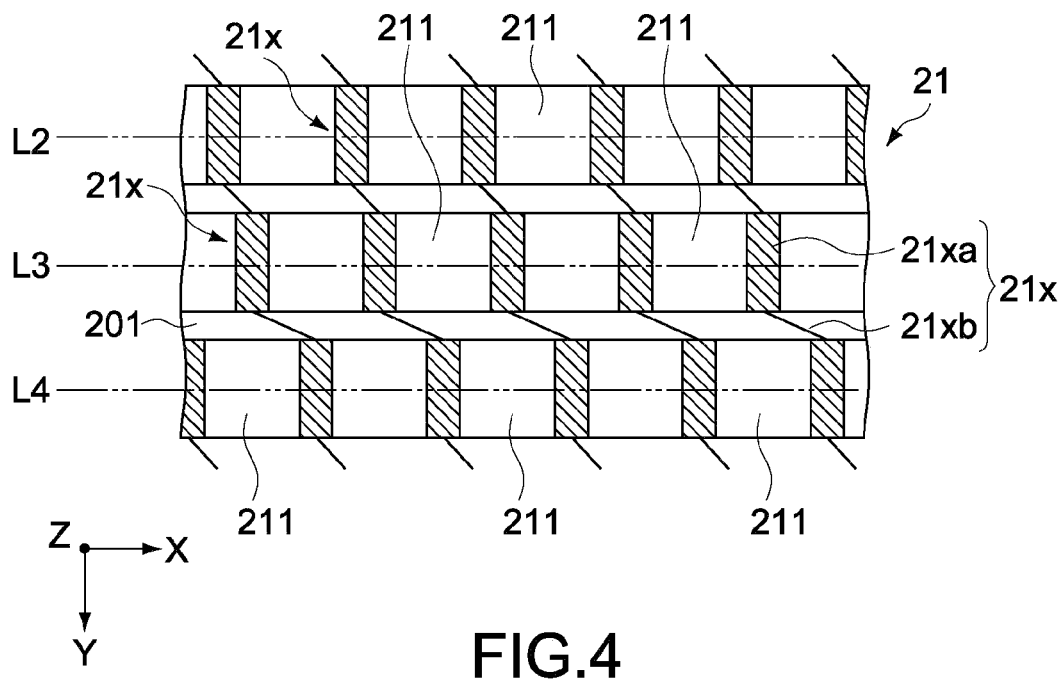
FIG. 4 is an enlarged view of a main part of the first sensor sheet.

FIG. 4 is a plan view of a main part of the first sensor sheet 21. Each of the first wiring electrodes 21x includes an electrode portion 21xa and a wiring portion 21xb. The electrode portions 21xa are adjacent to each other in the X-axis direction and positioned between the holes 211 of the respective rows (represented as L1, L2, L3, L4, and L5 in FIG. 3). The wiring portions 21xb individually connect the electrode portions 21xa of the respective rows. Specifically, the wiring portions 21xb connect the electrode portions 21xa positioned in the rows L1 to L5 as if to stride across the respective rows. The first wiring electrodes 21x are formed such that the electrode portions 21xa and the wiring portions 21xb are alternately arranged, and are arranged at intervals corresponding to the width of the hole 211 in the lateral direction (X-axis direction).

Since the holes 211 of the sheet base material 201 are formed so as to correspond to the key layout of the input keys 111, it is difficult to linearly form the first wiring electrodes 21x in longitudinal direction as if to thread through the plurality of holes 211. Therefore, the first wiring electrodes 21x are routed on the sheet base material 201 while being shifted in the lateral direction each time the first wiring electrodes 21x pass through each row of the holes 211. In this embodiment, the first wiring electrodes 21x are routed toward a direction obliquely intersecting both the longitudinal direction and the lateral direction as shown in FIG. 3 and FIG. 4. More specifically, the first wiring electrodes 21x are routed toward the lower right direction of the figures substantially as a whole between the row L1 of the holes in the uppermost row and the row L5 of the holes in the lowermost row.

The electrode portion 21xa and the wiring portion 21xb can be formed to have the same width, but in this embodiment, the width of the wiring portion 21xb is formed to be smaller than that of the electrode portion 21xa. Accordingly, when a detection target comes close, a capacitance change of the electrode portion 21xa becomes larger than that of the wiring portion 21xb, and detection accuracy in the lateral direction can be enhanced.

Figure 5:
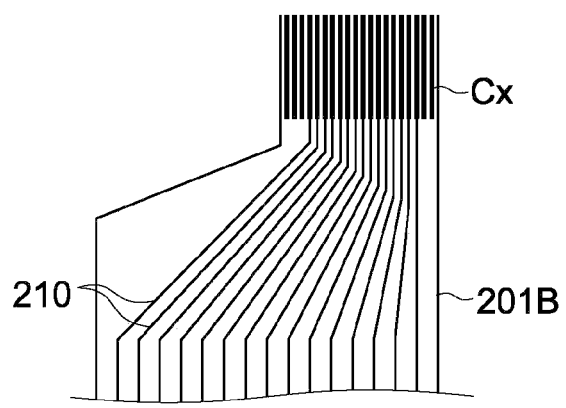
FIG. 5 is an enlarged view of another main part of the first sensor sheet.

FIG. 5 is an enlarged plan view showing an end portion of the coupling portion 201B of the sheet base material 201. On the coupling portion 201B, the connection wires 210 for connecting the first wiring electrodes 21x to a detection circuit (not shown) are formed. A plurality of terminal portions Cx to be connected to the detection circuit are arranged at the end portion of the coupling portion 201B, and are electrically connected to the connection wires 210.

In this embodiment, the arrangement intervals between the respective connection wires 210 on the coupling portion 201B are set to be larger than those between the terminal portions Cx, and at the end portion of the coupling portion 201B, the connection wires 210 are brought together so as to have the arrangement intervals equal to those between the terminal portions Cx. Accordingly, crosstalk between the connection wires 210 is suppressed.

Figure 6:
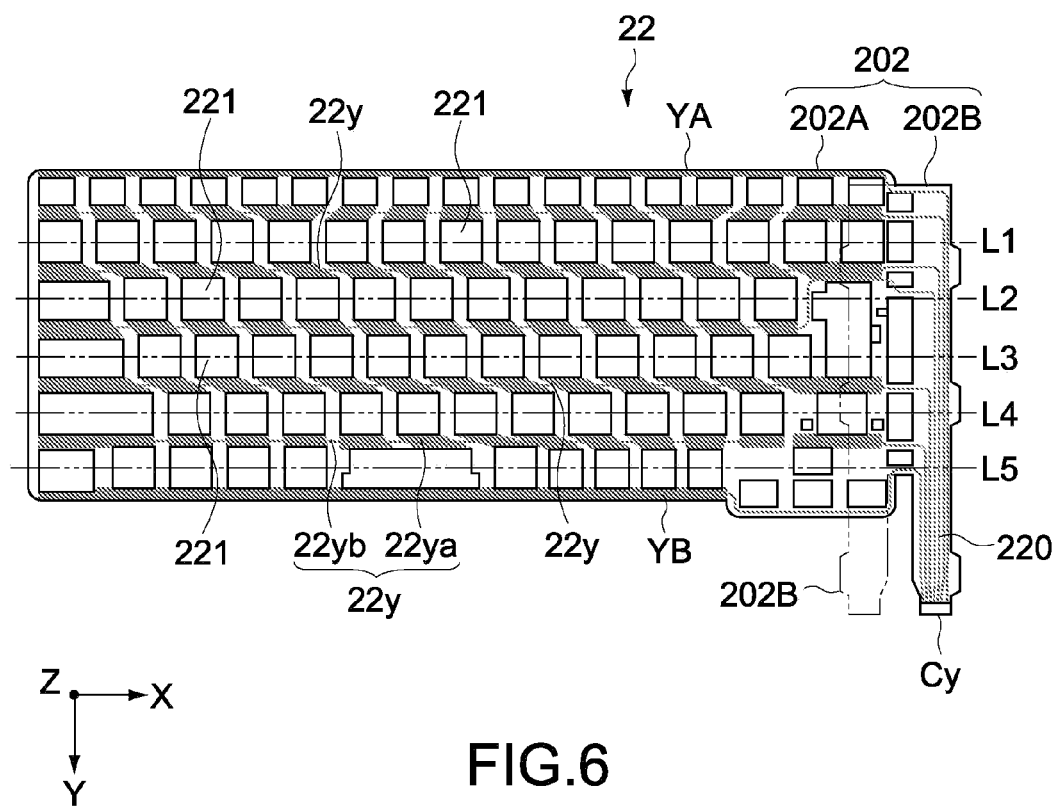
FIG. 6 is a plan view of a second sensor sheet attached to the input apparatus.

On the other hand, FIG. 6 is a plan view showing the structure of the second sensor sheet 22. The second sensor sheet 22 includes a second sheet base material 202 having electrical insulation properties and a plurality of second wiring electrodes 22y formed on the second sheet base material 202.

The second sheet base material 202 is formed of a resin material such as PET (polyethylene terephthalate), PEN (polyethylene naphthalate), or PC (polycarbonate). The second sheet base material 202 includes a main body portion 202A and a coupling portion 202B. The main body portion 202A includes a plurality of holes 221 corresponding to the key layout of the input keys 111, and the holes 221 are formed such that the input keys 111 can be individually inserted thereinto. The second wiring electrodes 22y are routed as if to thread through those holes. On the coupling portion 202B, a plurality of connection wires 220 for connecting the second wiring electrodes 22y to a detection circuit (not shown), and terminal portions Cy for connecting those connection wires to the detection circuit are formed. When the second sheet base material 202 is fixed inside the casing 100 of the input apparatus 10, the main body portion 202A is provided to the key array 11 and the coupling portion 202B is folded back with respect to the Y-axis direction as indicated by a chain double-dashed line in FIG. 6.

The second wiring electrodes 22y and the connection wires 220 are each formed of a metal material such as copper, aluminum, or silver. The second wiring electrodes 22y and the connection wires 220 may be formed by performing pattern etching on a conductive foil formed on the sheet base material 202, or may be formed by growing a metal wiring layer on the sheet base material 202 by a plating method.

Each of the second wiring electrodes 22y includes an electrode portion 22ya and a wiring portion 22yb. The electrode portions 22ya are adjacent to each other in the Y-axis direction and positioned between the holes 221 of the respective rows L1 to L5. The wiring portions 22yb individually connect the electrode portions 22ya belonging to the same row. Specifically, the second wiring electrodes 22y are formed such that the electrode portions 22ya and the wiring portions 22yb are alternately arranged in each of the rows L1 to L5. Further, the second wiring electrodes 22y are routed substantially parallel to the lateral direction (X-axis direction) and arranged at intervals corresponding to the height of the holes 221 in the longitudinal direction (Y-axis direction).

The width of the wiring portion 22yb is formed to be smaller than that of the electrode portion 22ya. Accordingly, when a detection target comes close, a capacitance change of the electrode portion 22ya becomes larger than that of the wiring portion 22yb, and detection accuracy in the longitudinal direction can be enhanced.

The first sensor sheet 21 and the second sensor sheet 22 structured as described above are attached to the inside of the casing of the input apparatus 10 as shown in FIG. 2. At this time, the sensor sheets 21 and 22 are each disposed on the key array 11.

In this embodiment, the sensor sheets 21 and 22 are formed so as to correspond to the key layout of the input keys 111 and includes the plurality of holes 211 and 221 into which the input keys 111 are inserted. Accordingly, when the sheet base materials 201 and 202 are attached to the circuit board 120, the first wiring electrodes 21x and the second wiring electrodes 22y are accurately positioned at predetermined positions around the input keys 111. It should be noted that the coupling portion 201B of the sensor sheet 21 and the coupling portion 202B of the sensor sheet 22 are folded back to the back surface of the circuit board 120.

Figure 7:
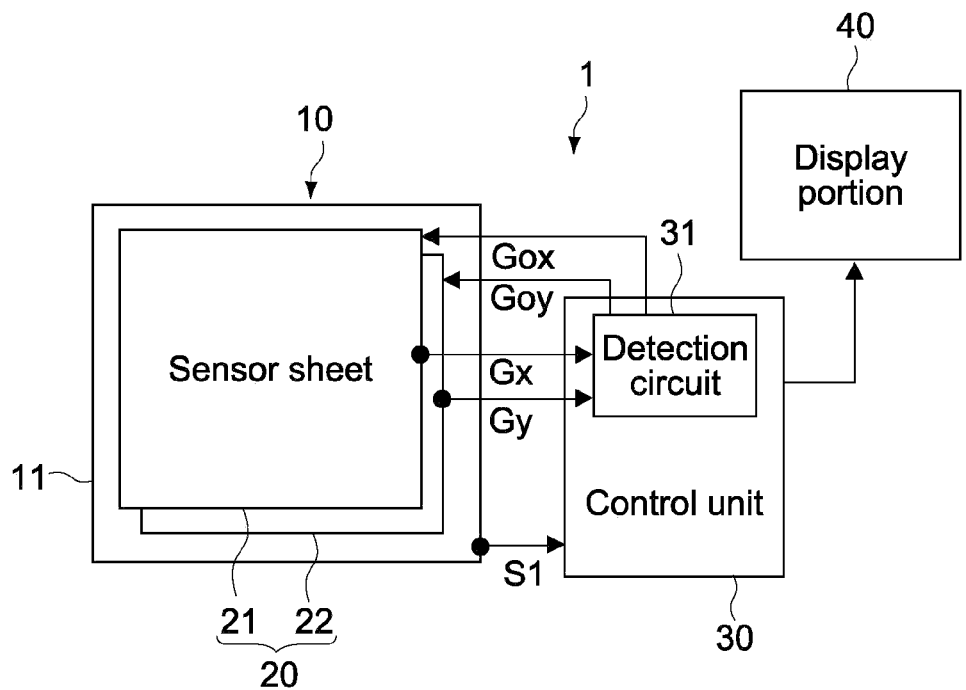
FIG. 7 is a schematic structure diagram of an information processing apparatus according to an embodiment of the present invention.

FIG. 7 is a schematic structure diagram of the information processing apparatus of this embodiment. An information processing apparatus 1 includes the input apparatus 10 and a control unit 30. The control unit 30 may be stored in the casing 100 of the input apparatus 10 or may be stored in an external device electrically connected to the input apparatus 10. Further, electrical connection between the input apparatus 10 and the control unit 30 may be made by a wired connection or wirelessly.

(Control Unit)

The control unit 30 is typically constituted of a computer. The control unit 30 receives an operation signal S1 generated by making input operations on the key array 11 and detection signals Gx and Gy detected by the sensor sheet group 20 to generate a control signal for controlling display of an image displayed on a display screen of a display portion 40. The operation signal S1 is output from the circuit board 120 that detects a push-down operation of the input keys 111. The detection signal Gx includes a signal related to a capacitance of each wiring electrode 21x constituting the first sensor sheet 21 (first signal), and the detection signal Gy includes a signal related to a capacitance of each wiring electrode 22y constituting the second sensor sheet 22 (second signal).

The control unit 30 includes a detection circuit 31 that drives the wiring electrodes 21x and 22y of the sensor sheets 21 and 22 and detects capacitances thereof (or changes thereof). Specifically, the detection circuit 31 supplies drive signals Gox and Goy to the sensor sheets 21 and 22, to thereby oscillate the wiring electrodes 21x and 22y. Then, the detection circuit 31 acquires information on presence or absence of the proximity of a finger F to the key array 11, the position of the finger F, a proximity distance of the finger F, or the like, based on the detection signals output from the wiring electrodes 21x and 22y.

The drive signals Gox and Goy are not particularly limited and any signals can be used as long as the signals can oscillate the wiring electrodes 21x and 22y. A pulse signal of a predetermined frequency, a high-frequency signal, an alternating-current signal, or a direct-current signal can be used, for example. The detection circuit 31 is not particularly limited and any circuit can be used as long as the circuit can detect capacitances of the wiring electrodes 21x and 22y or change amounts thereof. For example, the detection circuit 31 includes a conversion circuit that converts a capacitance change amount into an integer value (count value).

In this embodiment, the capacitances of the wiring electrodes 21x and 22y or changes thereof are detected by a so-called self-capacitance system. The self-capacitance system is also called a unipolar electrode system and one electrode thereof is used for sensing. The electrode for sensing has a stray capacitance with respect to a ground potential. When a grounded detection target such as a human body (hand and finger) comes closer, the stray capacitance of the electrode is increased. The detection circuit 31 detects an increase of the capacitances of the wiring electrodes 21x and 22y, to thereby determine the proximity of the finger F or position coordinates. It should be noted that a method of detecting the proximity position of the finger F will be described below.

The display portion 40 is constituted of a display device such as a liquid crystal display or an organic EL display. The display portion 40 includes a display surface on which an image is displayed, and the display of an image is controlled in accordance with an input operation of the input apparatus 10. It should be noted that the display portion 40 may be constituted of a part of the information processing apparatus 1.

(Operation of Information Processing Apparatus)

Hereinafter, together with the structure of the control unit 30, an example of operations of the information processing apparatus 1 will be described.

The input apparatus 10 generates an operation signal S1 corresponding to an input operation made on the key array 11 by a finger F of the user and outputs the operation signal S1 to the control unit 30. The control unit 30 controls an image displayed on the display portion 40 based on the operation signal S1 from the input apparatus 10.

The input apparatus 10 further generates detection signals Gx and Gy including information on the proximity of the finger F to the key array 11, a position thereof, a movement thereof, or the like and outputs the detection signals Gx and Gy to the control unit 30. The control unit 30 processes the detection signals Gx and Gy in the detection circuit 31 and generates a control signal including information on a proximity position of the finger F along the longitudinal direction and the lateral direction of the key array 11. The control unit 30 outputs the control signal to the display portion 40, to thereby control an image displayed on the display portion 40.

Examples of the display control of images based on the operation signal S1 and detection signals Gx and Gy include input of characters, drawing, an operation of moving a cursor, an operation of moving an icon, and an operation of executing various programs.

Hereinafter, a method of detecting a finger F in the detection circuit 31 will be described.

Figure 8:
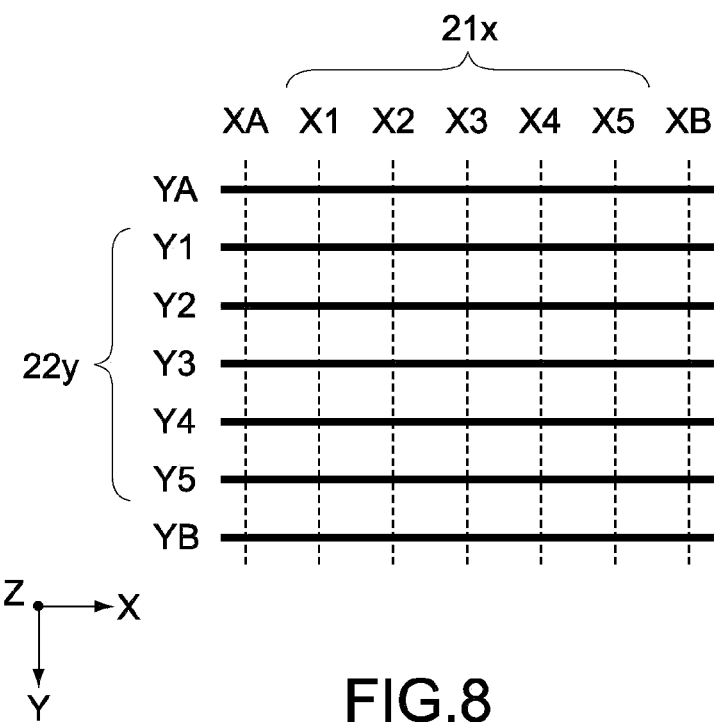
FIG. 8 is a schematic diagram for explaining an arrangement state of wiring electrodes formed on the first and second sensor sheets.

FIG. 8 is a schematic diagram showing the first wiring electrodes 21x and the second wiring electrodes 22y arranged in a matrix on the key array 11. FIG. 8 shows an example in which five first wiring electrodes 21x and five second wiring electrodes 22y are arranged (X1 to X5, Y1 to Y5). The detection circuit 31 sequentially supplies a drive signal Gox to each of the first wiring electrodes 21x (X1 to X5) and sequentially supplies a drive signal Goy to each of the second wiring electrodes 22y (Y1 to Y5). The detection circuit 31 further detects a proximity position of the finger F along the X-axis direction based on the detection signal Gx (first signal) output from each of the first wiring electrodes 21x (X1 to X5), and detects a proximity position of the finger F along the Y-axis direction based on the detection signal Gy (second signal) output from each of the second wiring electrodes 22y (Y1 to Y5). An oscillation order of the wiring electrodes 21x (X1 to X5) and 22y (Y1 to Y5), that is, a scanning method therefor is not particularly limited. For example, the wiring electrodes (X1 to X5, Y1 to Y5) are line-sequentially oscillated.

Figure 9:
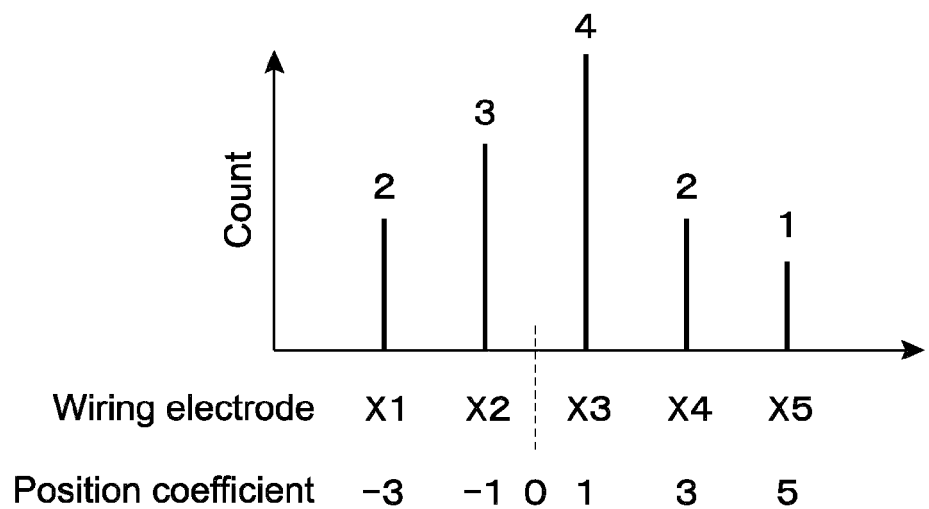
FIG. 9 is a diagram for explaining a method of detecting a position of a detection target by using the sensor sheets.

The position of the finger F may be specified by calculation of the center of gravity. FIG. 9 shows a relationship between a count value based on a capacitance change amount of each of the wiring electrodes X1 to X5 at a certain moment and a coefficient set in advance for each of the positions of the wiring electrodes X1 to X5. In the example of FIG. 9, the X position of the finger F is obtained as follows.

$$\{(-3\times2)+(-1\times3)+(1\times4)+(3\times2)+(5\times1)\}/\{2+3+4+2+1\}=0.5 \quad (1)$$

Therefore, in the example of FIG. 9, the position of the center of gravity corresponds to a position at a distance of 0.5 from a reference point.

Figure 10:
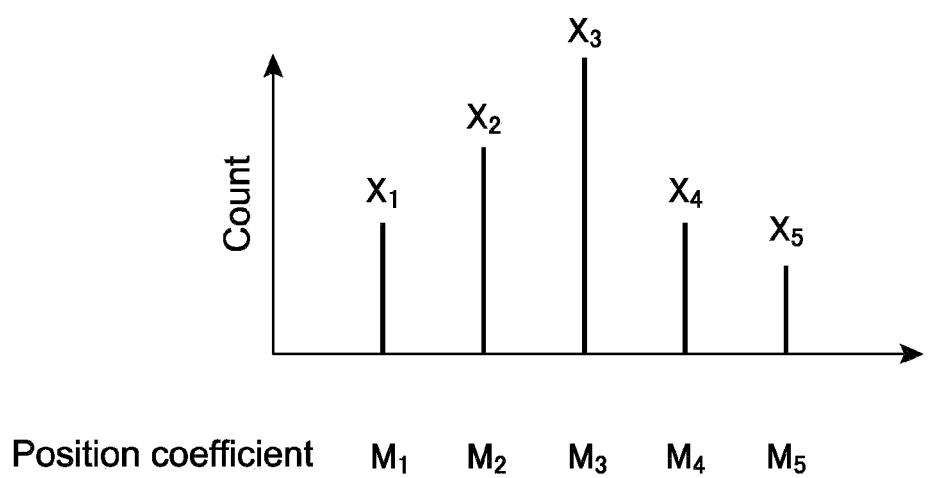
FIG. 10 is a diagram for explaining a method of detecting a position of a detection target by using the sensor sheets.

FIG. 10 is a diagram obtained by generalizing FIG. 9. Assuming that a position from the reference point is M and a magnitude of a capacitance at the position is X, Expression (1) above is generalized as shown in Expression (2).

$$\text{Position of center of gravity} = \Sigma M_i X_i / \Sigma X_i \quad (2)$$

It should be noted that the Y position of the finger F based on the capacitance change amount of each of the wiring electrodes Y1 to Y5 is also processed in the same way.

In calculating the position of the center of gravity, the calculation accuracy thereof can be increased as the number of wiring electrodes is larger. In this regard, as shown in FIG. 8, dummy electrodes XA, XB, YA, and YB may be added to the wiring electrodes X1 to X5 and Y1 to Y5. The dummy electrodes XA, XB, YA, and YB are used for the processing of detection signals of the wiring electrodes X1 to X5 and Y1 to Y5, that is, for the calculation of the position of the center of gravity of the finger F. More specifically, those dummy electrodes are also given arbitrary coefficients corresponding to the positions thereof so that the position of the center of gravity is calculated by Expression (2) above. In this case, capacitance changes of the respective dummy electrodes (count values) may be ignored.

For example, as shown in FIG. 3, the dummy electrodes XA and XB are formed along margins of both the ends of the sheet base material 201 in the X-axis direction (lateral direction). Further, as shown in FIG. 6, for example, the dummy electrodes YA and YB are formed along margins of both the ends of the sheet base material 202 in the Y-axis direction (longitudinal direction). Accordingly, when the sheet base materials 201 and 202 are attached to the key array 11, the dummy electrodes XA, XB, YA, and YB are arranged on both the ends of the key array 11 in the lateral direction and the longitudinal direction. The dummy electrodes are not limited to be arranged on both the ends of the key array 11 in the lateral direction and the longitudinal direction, and may be arranged on only one end thereof in the lateral direction and/or longitudinal direction.

On the other hand, in the input apparatus 10 of this embodiment, the first wiring electrodes 21x are routed between the input keys 111 in an oblique direction while being shifted in the lateral direction each time the first wiring electrodes 21x pass through the input keys 111 in the rows L1 to L5. Therefore, the first wiring electrodes 21x are not linearly formed unlike FIG. 8, and each have an amount of shift in the X-axis direction that corresponds to the rows (L1 to L5) to which the input keys 111 belong. Therefore, the X position has to be corrected in accordance with the position of the finger F along the Y-axis direction (Y position).

Figure 11:
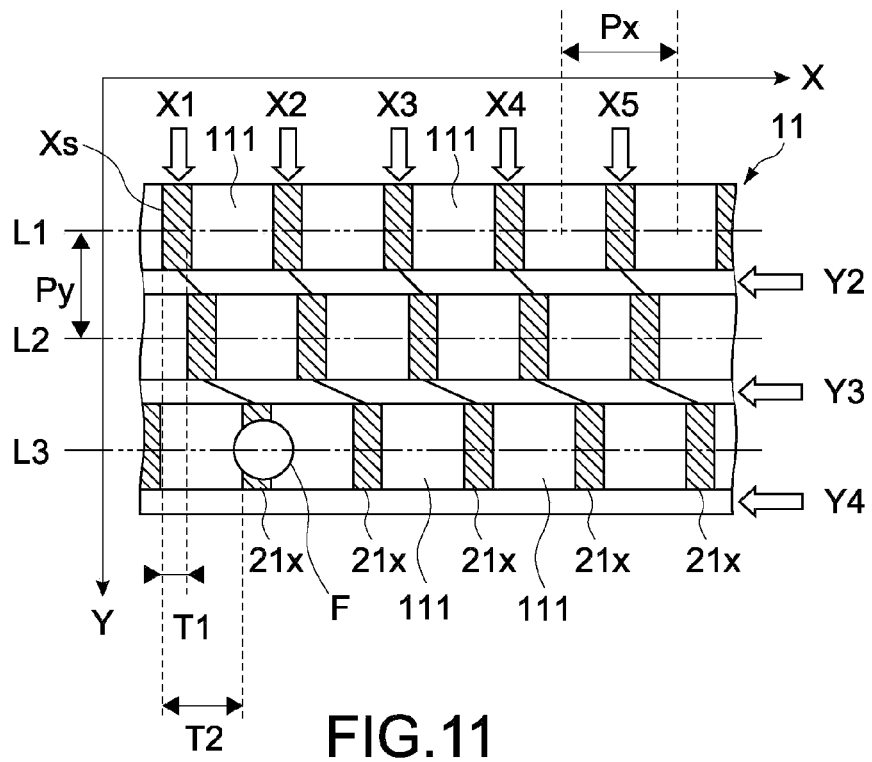
FIG. 11 is a plan view of a main part for explaining an example of routing of first wiring electrodes arranged on the input apparatus.

FIG. 11 is a plan view of a main part of the key array 11 for explaining a relationship between the rows L1 to L3 of the input keys 111 and a shift amount of the first wiring electrodes 21x. The input keys 111 of each row are arranged at a constant pitch (Px,Py) in the X-axis direction and the Y-axis direction. In this embodiment, the input keys 111 belonging to the second row L2 are shifted by T1 (<Px) in a +X direction with respect to the input keys 111 belonging to the first row L1. Further, the input keys 111 belonging to the third row L3 are shifted by T2 in the +X direction with respect to the input keys 111 belonging to the first row L1 and shifted by (T2−T1) (<Px) in the +X direction with respect to the input keys 111 belonging to the second row L2. Thereafter, the input keys 111 belonging to the fourth and fifth rows L4 and L5 are shifted by T3 and T4, respectively, in the +X direction with respect to the input keys 111 belonging to the first row L1. Therefore, when the Y position of the finger F (rows L1 to L5) is determined, by correction of the X position by a shift amount (T1 to T4) of the input keys that corresponds to the Y position, an accurate X position of the finger F can be detected.

As described above, the detection circuit 31 of this embodiment detects an increase in capacitance of the wiring electrodes 21x (X1 to X5) and 22y (Y1 to Y5), to thereby determine position coordinates or proximity of the finger F. The proximity of the finger F can be determined based on whether a capacitance (count value) of any of the wiring electrodes exceeds a predetermined threshold value or not. In other words, when the capacitance described above exceeds the threshold value, the proximity of the finger F to the key array 11 is determined. When the threshold value is not exceeded, it is determined that the proximity of the finger F to the key array 11 is absent. A plurality of threshold values may be set for the above threshold value. In this case, a proximity distance of the finger F can be determined based on whether the threshold value is exceeded or not.

Further, by changing the number of electrodes to be scanned in accordance with the proximity distance, it is possible to suppress a change in sensitivity due to a difference in proximity distance. In other words, a thinning-out amount of the electrodes is increased when the finger F is spaced apart, and the number of electrodes to be scanned is increased as the finger F comes close.

The proximity position of the finger F is determined by the calculation of the center of gravity and the correction calculation of the X position based on the capacitances (count values) of the wiring electrodes. For example, the Y position is calculated from the magnitude of capacitances of the second wiring electrodes 22y (Y1 to Y5) arranged in the Y-axis direction. Since the second wiring electrodes 22y (Y1 to Y5) are extended parallel to the rows of the input keys 111, the result of the calculation of the center of gravity substantially corresponds to a real Y position of the finger F.

Figure 12:
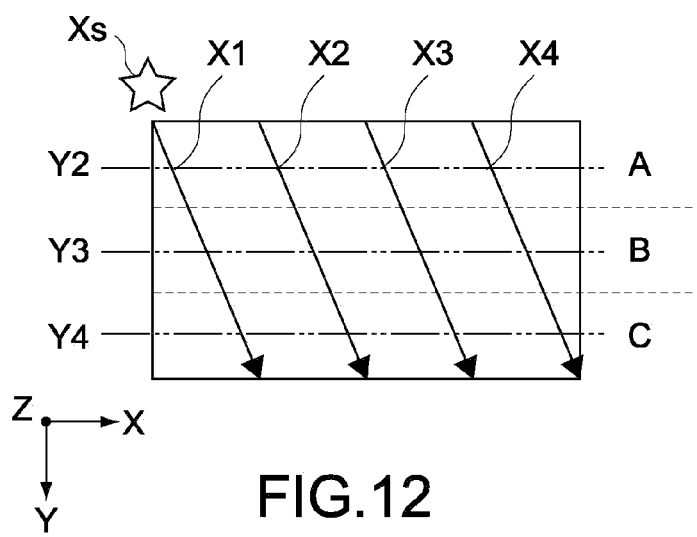
FIG. 12 is a schematic diagram for explaining a direction of routing of the first wiring electrodes.

On the other hand, the first wiring electrodes 21x (X1 to X5) are extended in an obliquely intersecting direction with respect to the X-axis direction and the Y-axis direction as schematically shown in FIG. 12. Accordingly, for the X position of the finger F, the correction calculation in which a predetermined shift amount (T1 to T5) corresponding to the Y position of the finger F is taken into account is executed.

For example, as shown in FIG. 12, it is assumed that a key array in which the wiring electrodes (X1 to X4) are arranged in arrow directions is divided into a plurality of areas A to C. When a position of each input key belonging to a first row (L1) is represented as a reference position Xs, a shift amount from the reference position Xs in an X direction is a maximum in the area C of the areas A, B, and C. In such a case, when the finger F is determined to be in the area C, a correction coefficient used for calculating the X position of the finger F is larger than a correction coefficient of the area A. Here, the areas A to C correspond to the respective detection areas of the wiring electrodes Y2 to Y4, for example.

Figure 13:
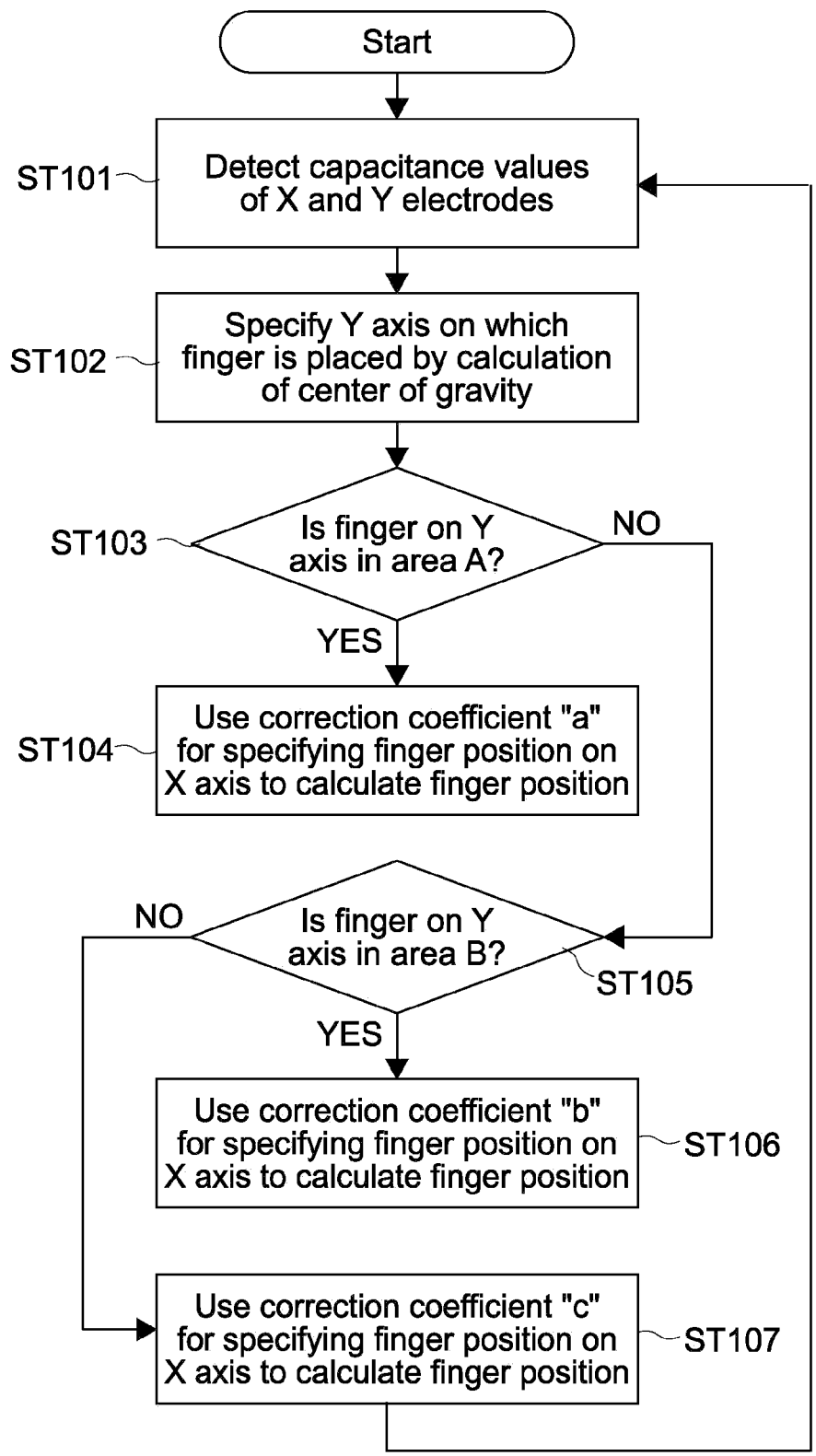
FIG. 13 is a control flowchart for explaining an example of a method of detecting a position of a detection target on the input apparatus.

FIG. 13 is a flowchart for explaining one detection method for the proximity position of a finger F. The detection circuit 31 first detects capacitances of the first wiring electrodes 21x (X1 to X5) and second wiring electrodes 22y (Y1 to Y5) based on detection signals Gx and Gy of the first sensor sheet 21 and second sensor sheet 22 (Step 101). In this step, the presence or absence of the proximity of the finger F is also determined.

When determining that the finger F comes close to the key array 11, the detection circuit 31 determines the Y position of the finger F by the calculation of the center of gravity described above (Step 102). Then, the detection circuit 31 determines whether the proximity position of the finger F is in the area A of FIG. 12. In the case where the proximity position of the finger F is determined to be in the area A, the detection circuit 31 uses a correction coefficient "a" corresponding to the area A to calculate the X position of the finger F (Steps 103 and 104).

On the other hand, in the case where the finger F is not determined to be in the area A, the detection circuit 31 determines whether the proximity position of the finger F is in the area B of FIG. 12. In the case where the proximity position of the finger F is determined to be in the area B, the detection circuit 31 uses a correction coefficient "b" corresponding to the area B to calculate the X position of the finger F (Steps 105 and 106). Further, in the case where the finger F is not determined to be in the area B, the detection circuit 31 determines that the proximity position of the finger F is in the area C of FIG. 12, and uses a correction coefficient "c" corresponding to the area C to calculate the X position of the finger F (Step 107).

To calculate the X position of the finger F, the following expression is used, for example.

$$X = Xn + T(Ym) \qquad (3)$$

In Expression (3) above, "Xn" is an electrode number of the first wiring electrodes 21x (X1 to X5). Further, "T(Ym)" is a shift amount (T1 to T5) corresponding to an electrode number of the second wiring electrodes 22y (Y1 to Y5) and corresponds to the correction coefficient described above (for example, a, b, c, ...).

The description above is a processing example for the case where the key array 11 is divided into three areas of the areas A to C in the longitudinal direction. The number of areas is not limited to that of the above example, and the key array may be divided into a larger number of areas. In this case, the above processing is similarly executed in accordance with the number of areas. Further, though not limited to the above processing example, processing including the calculation of the X position by using a correction coefficient corresponding to the Y position may be executed immediately after the Y position of the finger F is specified in Step 102.

As described above, based on the capacitances of the first wiring electrodes 21x, the capacitances of the second wiring electrodes 22y, and the shift amount of the input keys 111 in each row in the lateral direction, a control signal including a signal on the position of the finger F along the lateral direction and the longitudinal direction is generated. Accordingly, predetermined image control corresponding to the proximity position of the finger F is executed.

The control unit 30 may further include a storage portion for storing the proximity position of the finger F. In this case, based on the change in proximity position of the finger F, movement control of a cursor on the screen or the like is executable. Further, as shown in FIG. 2, by moving the finger F from front to back and from side to side, it is possible to realize image control set in advance in accordance with a trajectory of the finger F (that is, gesture input), such as screen scrolling or screen zooming.

The input apparatus 10 may independently output the operation signal S1 and the detection signals Gx and Gy to the control unit 30, but may also output one of the signals to the control unit 30 in accordance with an input operation mode. The input operation mode may be switched by, for example, the display screen of the display portion 40, or an input operation made on a specific input key 111 of the key array 11.

As described above, in the information processing apparatus 1 of this embodiment, the first and second wiring electrodes 21x and 22y that electrostatically detect a user's finger F serving as a detection target are routed as if to thread through the input keys 111. In addition, the control unit 30 generates a control signal including information on the proximity position of the finger F based on the capacitances of the wiring electrodes 21x and 22y and the shift amount of the input keys 111 in each row in the lateral direction. Accordingly, it is possible to detect an accurate position of a detection target that comes close to a position immediately above the plurality of input keys 111 arranged on a two-dimensional plane in a non-matrix pattern.

Further, in this embodiment, the first wiring electrodes 21x are routed in the oblique direction shown in FIG. 12 as if to thread through the input keys 111. Accordingly, the first wiring electrodes 21x can be routed between the input keys 111 without alternately intersecting each other.

In addition, the first wiring electrodes 21x and the second wiring electrodes 22y are constituted of the first sensor sheet 21 and the second sensor sheet 22, respectively. Accordingly, when the sensor sheets 21 and 22 are mounted to the key array 11, the first and second wiring electrodes 21x and 22y can be accurately arranged at predetermined positions around the input keys 111.

On the other hand, although the proximity position of the finger F is electrostatically detected using the sensor sheets 21 and 22 in this embodiment, the following structure is provided in order to improve the detection sensitivity or detection accuracy.

(1) Arrangement Interval of Connection Wires

As described above, the first wiring electrodes 21x are electrically connected to the control unit 30 via the terminal portions Cx. At this time, the first wiring electrodes 21x are connected to the terminal portions Cx via the connection wires 210 in the coupling portion 201B of the sheet base material 201 (see FIG. 5). In this case, in order to improve the detection accuracy of the finger F, it is more advantageous to route the connection wires 210 in the coupling portion 201B at wiring intervals wider than the intervals of the terminal portions Cx as shown in FIG. 14B than to route the connection wires 210 in the coupling portion 201B at wiring intervals that are relatively narrow and equal to the arrangement intervals of the terminal portions Cx as shown in FIG. 14A.

FIG. 15 shows simulation results showing an example of detection characteristics of a finger at a time when sensor sheets having the structures shown in FIGS. 14A and 14B are used. In FIG. 15, "■" corresponds to the sensor sheet shown in FIG. 14A and "▲" corresponds to the sensor sheet shown in FIG. 14B. In FIG. 15, the horizontal axis represents an electrode position of the wiring electrode 21x, and the vertical axis represents a capacitance of each wiring electrode 21x. It should be noted that "Maxwell3D" manufactured by Ansoft Corporation is used for simulation software. As simulation conditions, in the structure of FIG. 14A, a wiring width and a wiring interval of the connection wires 210 are each set to 0.5 mm, and in the structure of FIG. 14B, the wiring width of the connection wires 210 is set to 0.5 mm and the wiring interval thereof is set to 1.5 mm. Further, a width and an interval of the terminal portions Cx are each set to 0.3 mm.

As shown in FIG. 15, a half-band width of a detection peak when a finger is caused to come close to a center electrode position (Rx) in the structure of FIG. 14A is larger than that in the structure of FIG. 14B. This is considered because of crosstalk caused between the connection wires 210 in the terminal portions Cx. Therefore, as the wiring interval between the connection wires 210 is larger, the detection accuracy of the position of the finger is improved. In other words, from the viewpoint of the improvement of the detection accuracy, it is desirable to arrange the connection wires 210 over the entire width area of the coupling portion 201B, and a larger width dimension of the coupling portion 201B is also desirable. Such a structure is also applied to the connection wires 220 of the second wiring electrodes 22y.

(2) Routing Area of Connection Wires

Similarly to the wiring electrodes 21x and 22y, capacitances of the connection wires 210 and 220 are changed by the proximity of a human body serving as a detection target. Therefore, when the connection wires 210 and 220 are present in the vicinity of a palm or wrist of a user operating the input apparatus 10, the lowering of the detection accuracy due to the wiring electrodes 21x and 22y is caused. In this regard, in this embodiment, the connection wires 210 and 220 are routed so as to avoid a palm or wrist of a user.

Figure 16A:
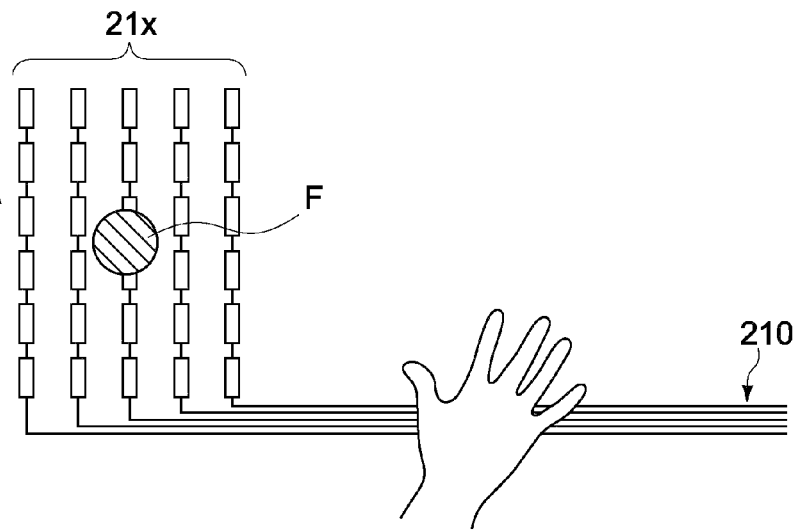
FIG. 16 are schematic diagrams for explaining examples of routing of wires connected to the connection terminal.
Figure 16B:
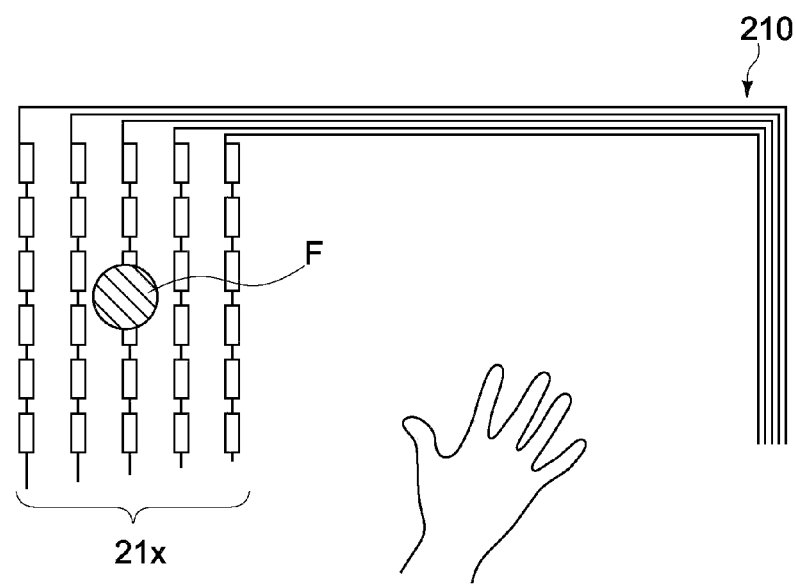
Figure 17:
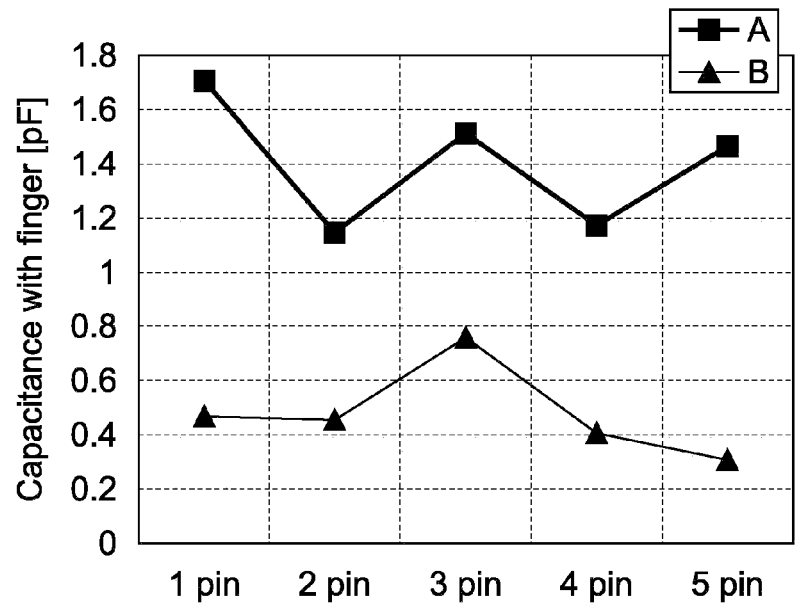
FIG. 17 is a graph showing a relationship between the examples of routing of wires and detection characteristics.

FIG. 16A shows a state where the connection wires 210 of the first wiring electrodes 21x are routed to a lower margin of the casing 100 of the input apparatus 10 (on the near side of a user) and are opposed to the palm of the user, for example. FIG. 16B shows a state where the connection wires 210 are routed to an upper margin of the casing 100 (on the deeper side of the user) and are not opposed to the palm of the user, for example. FIG. 17 shows detection characteristics of the wiring electrodes 21x when the finger F is caused to come close to a center electrode position of the wiring electrodes 21x as shown in FIGS. 16A and 16B, and "■" corresponds to the structure shown in FIG. 16A and "▲" to the structure shown in FIG. 16B. As shown in FIG. 17, it is found that in the structure of FIG. 16A, a capacitance value of the wiring electrodes 21x is large because of capacitive coupling of the connection wires 210 and the palm, but the detection accuracy of the position of the finger F is largely lowered. In contrast to this, according to the structure of FIG. 16B, a detection peak of a capacitance appears at the center electrode position, and the detection accuracy of the finger F can be secured.

Figure 18:
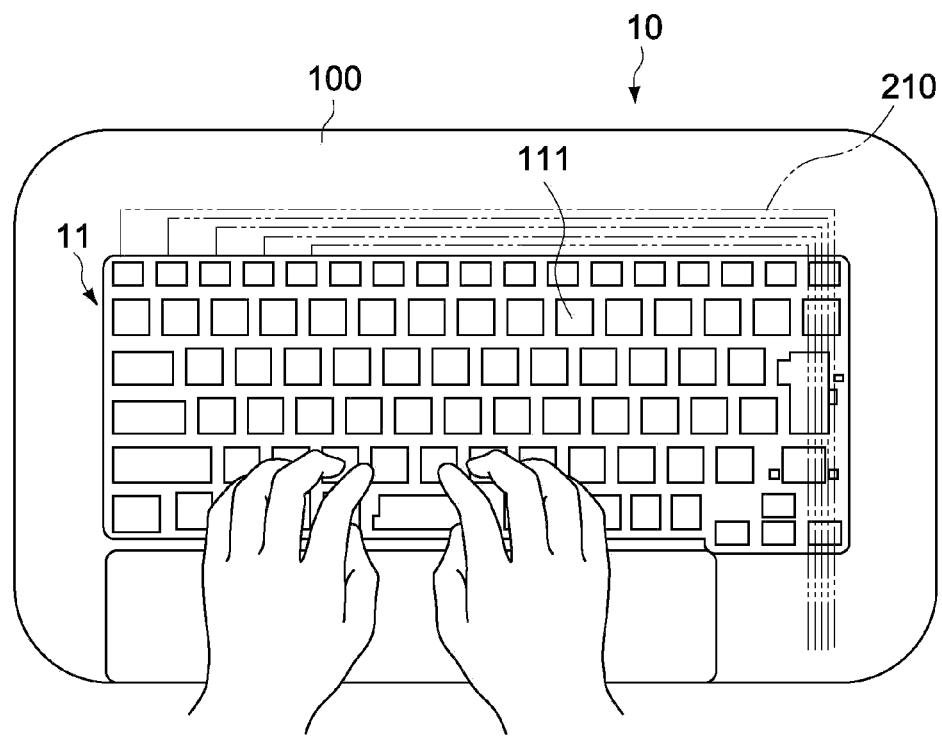
FIG. 18 is a plan view of the input apparatus for explaining the example of routing of wires.

In this embodiment, the connection wires 210 and 220 are routed as shown in FIG. 3 and FIG. 6. Therefore, as shown in FIG. 18, the connection wires 210 and 220 can be routed so as to avoid the home position of a hand and finger of a user operating the input apparatus 10. Accordingly, it is possible to suppress the lowering of the detection accuracy of the position of a finger F by the wiring electrodes 21x and 22y. The routing position of the connection wires 210 and 220 is not limited to the right-hand side position of the input apparatus 10 shown in FIG. 18, and may be the left-hand side position, for example.

(3) Shape of Electrode Portion

As described above, the first and second wiring electrodes 21x and 22y are formed by alternately connecting the electrode portions 21xa and 22ya and the wiring portions 21xb and 22yb. Here, it is desirable to form the electrode portions 21xa and 22ya to have a relatively large area in order to enhance the detection sensitivity of the finger F. However, when a sharp edge portion is present in the outer shape of the electrode portion, the concentration of the electric field is cased in the edge portion, which leads to a problem of crosstalk between adjacent wiring electrodes. In this regard, in this embodiment, an edge portion that is not sharp is formed in each of the electrode portions 21xa and 22ya, and crosstalk between adjacent electrodes resulting from the presence of a sharp edge portion is suppressed.

Figure 19A:
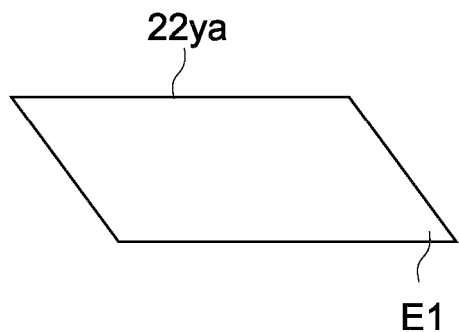
FIG. 19 are diagrams showing a shape example of an electrode portion of the wiring electrodes formed on the second sensor sheet and an example of electric field intensity distribution thereof.
Figure 19B:
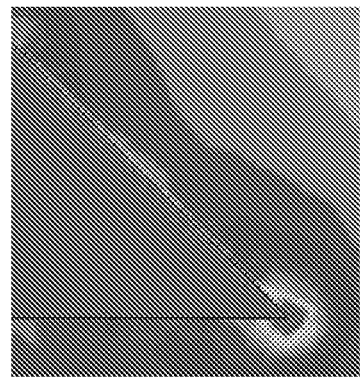
Figure 20A:
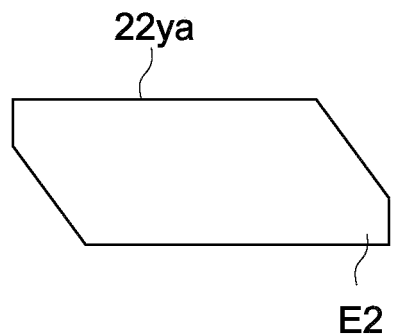
FIG. 20 are diagrams showing another shape example of the electrode portion and an example of electric field intensity distribution thereof.
Figure 20B:
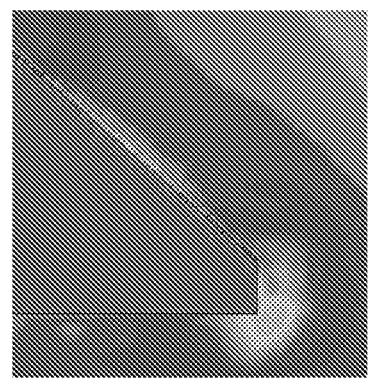

As an example, FIG. 19 and FIG. 20 show electrode shapes of the electrode portion 22ya and simulation results of the electric field intensity distribution of edge portions thereof. In the electrode shape shown in FIG. 19, an edge portion E1 of the electrode portion 22ya is formed to be sharp, and accordingly the concentration of the electric field is easy to be caused in the edge portion E1. In contrast to this, in the electrode shape shown in FIG. 20, an edge portion E2 of the electrode portion 22ya is formed to have a shape that is not sharp, and accordingly the concentration of the electric field of the edge portion can be relieved. To form the edge portion in a non-sharp shape, for example, cutoff of an acute-angled portion and R-processing of the edge portion are performed.

Figure 21:
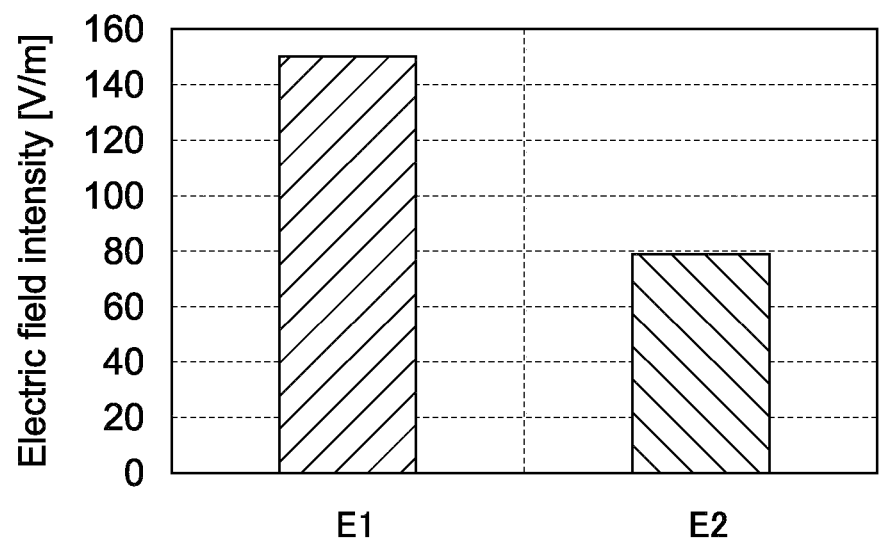
FIG. 21 is a graph for explaining a relationship between the shape of the electrode portion and electric field intensity thereof.
Figure 22:
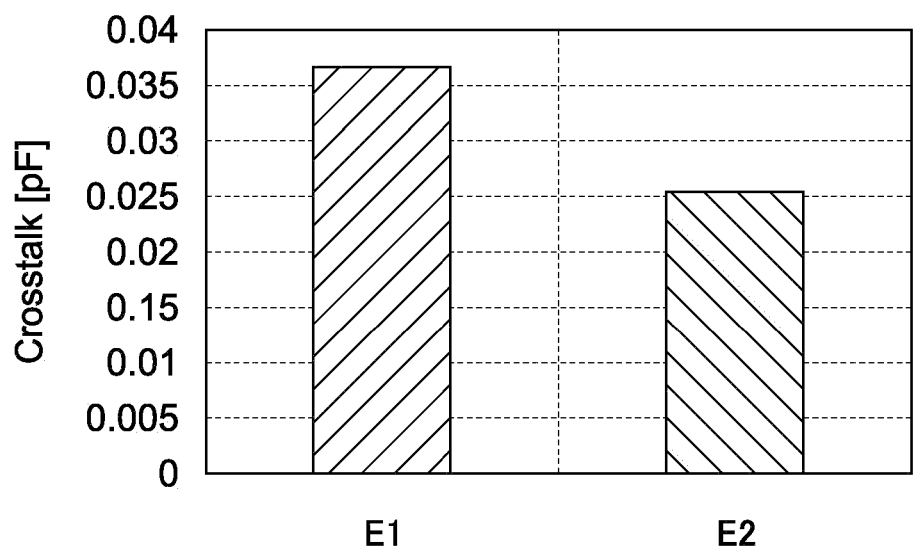
FIG. 22 is a graph for explaining a relationship between the shape of the electrode portion and crosstalk caused between adjacent electrodes.

FIGS. 21 and 22 show one example of simulation results of comparison between electric field intensities and between magnitudes of crosstalk of adjacent electrodes in the vicinity of the edge portions, due to the difference in shape of the edge portions. In FIG. 21 and FIG. 22, "E1" corresponds to a sample of an electrode shape having the sharp edge portion E1 shown in FIG. 19, and "E2" corresponds to a sample of an electrode shape having the non-sharp edge portion E2 shown in FIG. 20. As is apparent from the results of FIG. 21 and FIG. 22, by forming the edge portion of the electrode portion in a non-sharp shape, it is possible to relieve the concentration of the electric field at the edge portion and also suppress the crosstalk between adjacent wiring electrodes. Such a structure is also applied to the electrode portion 21xa of the first wiring electrodes 21x.

(4) Intersection Portion of Wiring Electrodes

In this embodiment, the first and second wiring electrodes 21x and 22y arranged in a matrix with respect to the key array 11 have the structure in which the electrode portions 21xa and 22ya and the wiring portions 21xb and 22yb are alternately repeatedly arranged. Further, the wiring portions 21xb and 22yb are formed to be narrower than the electrode portions 21xa and 22ya. Further, an intersection area of the wiring electrodes 21x and 22y is formed by the wiring portions 21xb and 22yb of the respective wiring electrodes. Accordingly, crosstalk between the first wiring electrodes 21x and the second wiring electrodes 22y can be suppressed and the lowering of the detection accuracy of a finger F can be suppressed.

Figure 23A:
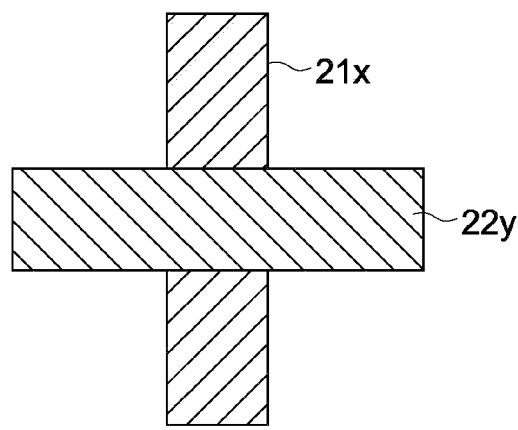
FIG. 23 are schematic plan views for explaining a shape example of an intersection portion of wiring electrodes formed on the respective first and second sensor sheets.
Figure 23B:
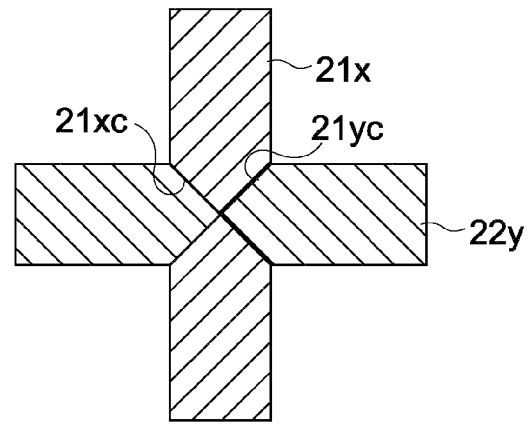
Figure 23C:
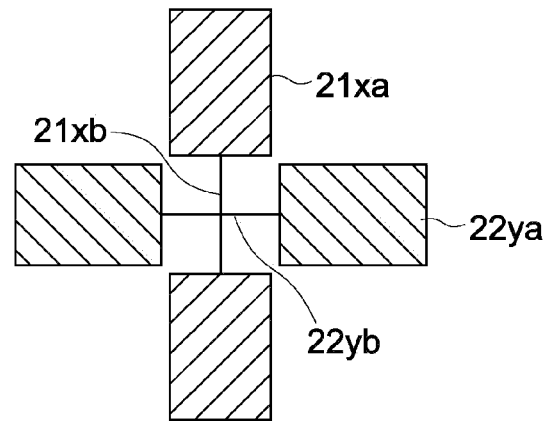
Figure 24:
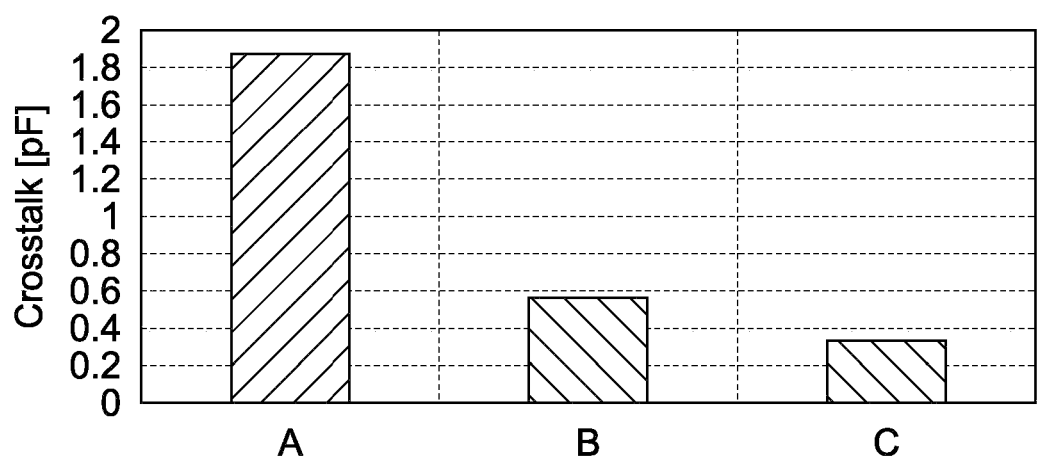
FIG. 24 is a graph for explaining a relationship between an electrode shape of the intersection portion and crosstalk caused between the wiring electrodes.

FIG. 23 show the shapes of an intersection portion of the wiring electrodes 21x and 22y and FIG. 24 shows a relationship between the shapes and crosstalk between the electrodes. FIG. 23A shows an intersection area of the wiring electrodes 21x and 22y each having a uniform electrode width. FIGS. 23B and 23C each show an electrode shape for minimizing the intersection area of the wiring electrodes 21x and 22y shown in FIG. 23A. FIG. 23B shows an example in which the intersection portion of the electrodes 21x and 22y is formed to be triangle-shaped, and FIG. 23C shows an example in which the intersection portion of the electrodes 21x and 22y is formed by the wiring portions 21xb and 22yb. FIG. 24 shows the comparison between the magnitudes of crosstalk of the electrode structures shown in FIGS. 23A to 23C, and "A" corresponds to the electrode structure of FIG. 23A, "B" to that of FIG. 23B, and "C" to that of FIG. 23C. As shown in FIG. 24, the crosstalk between the electrodes is reduced in the order of A, B, and C. In other words, according to the electrode structure shown in FIG. 23C, a facing area between the electrodes in the vicinity of the intersection portion can be made smallest, and accordingly the crosstalk can be suppressed to be a minimum level.

Hitherto, the embodiment of the present invention has been described, but the present invention is not limited to the above and can be variously modified based on the technical idea of the present invention.

For example, in the embodiment described above, the input apparatus 10 is constituted of a keyboard, but it is not limited thereto. For example, the present invention is applicable to various electronic apparatuses in which operation buttons are arranged in a non-matrix pattern, such as a controller of a game device and portable information terminals.

Further, in the embodiment described above, the terminal portions Cx and Cy are formed on the sensor sheets 21 and 22, and the wiring electrodes 21x and 22y are connected to the control unit 30 via those terminal portions Cx and Cy. Instead, electronic parts constituting the control unit 30 may be directly mounted at positions where the terminal portions Cx and Cy are formed.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a key array having a key layout in which a plurality of rows of input keys parallel to a first direction are arranged in a second direction orthogonal to the first direction and input keys belonging to a first row in the plurality of rows are arranged to be shifted in the first direction with respect to input keys belonging to a second row in the plurality of rows;

a plurality of first wiring electrodes that are routed between the input keys at intervals in the first direction and each having a capacitance changed by a proximity of a detection target;

a plurality of second wiring electrodes that are routed along the first direction to thread through the plurality of rows of the input keys and each having a capacitance changed by the proximity of the detection target; and a control unit configured to generate a control signal including a first signal on a position of the detection target along the first direction based at least in part on the capacitances of the plurality of first wiring electrodes, the capacitances of the plurality of second wiring electrodes, and a shift amount of the input keys in each of the rows in the first direction.

2. The information processing apparatus according to claim 1, wherein
the plurality of first wiring electrodes are routed in a third direction that obliquely intersects the first direction and the second direction.

3. The information processing apparatus according to claim 2, further comprising a first sheet base material that is attached to the key array, has a plurality of holes through which the input keys pass, and supports the plurality of first wiring electrodes.

4. The information processing apparatus according to claim 3, wherein
each of the plurality of first wiring electrodes includes
a first electrode portion positioned between the input keys of each row that are adjacent in the first direction, and
a first wiring portion that individually connects the first electrode portions of the respective rows and is routed in the third direction in a wiring width narrower than that of the first electrode portion.

5. The information processing apparatus according to claim 1, wherein
the control unit generates the control signal further including a second signal on a position of the detection target along the second direction based at least in part on the capacitances of the plurality of second wiring electrodes.

6. The information processing apparatus according to claim 5, further comprising a second sheet base material that is attached to the key array, has a plurality of holes through which the input keys pass, and supports the plurality of second wiring electrodes.

7. The information processing apparatus according to claim 1, wherein
each of the plurality of second wiring electrodes includes
a second electrode portion positioned between the input keys of the respective rows that are adjacent in the second direction, and
a second wiring portion that individually connects the second electrode portions belonging to the same row and is routed in the first direction in a wiring width narrower than that of the second electrode portion.

8. The information processing apparatus according to claim 7, wherein
the second electrode portion includes an edge portion having a non-sharp shape.

9. The information processing apparatus according to claim 1, further comprising a first dummy electrode that is arranged at least at one end of the key array in the first direction and used for processing of the first signal.

10. The information processing apparatus according to claim 5, further comprising a second dummy electrode that is arranged at least at one end of the key array in the second direction and used for processing of the second signal.

11. An input apparatus comprising:
a key array having a key layout in which a plurality of rows of input keys parallel to a first direction are arranged in a second direction orthogonal to the first direction and input keys belonging to a first row in the plurality of rows are arranged to be shifted in the first direction with respect to the input keys belonging to a second row in the plurality of rows;

a plurality of first wiring electrodes that are routed between the input keys at intervals in the first direction and each having a capacitance changed by a proximity of a detection target;

a plurality of second wiring electrodes that are routed along the first direction to thread through the plurality of rows of the input keys and each having a capacitance changed by the proximity of the detection target; and a control unit configured to generate a control signal used for controlling a movement of an image along the first direction, the image being displayed on a display screen, based at least in part on the capacitances of the plurality of first wiring electrodes, the capacitances of the plurality of second wiring electrodes, and a shift amount of the input keys in each of the rows in the first direction.

12. An information processing method comprising:
detecting a capacitance of each of a plurality of first wiring electrodes that are arranged on a key array having a key layout in which a plurality of rows of input keys parallel to a first direction are arranged in a second direction orthogonal to the first direction and input keys belonging to a first row in the plurality of rows are arranged to be shifted in the first direction with respect to the input keys belonging to a second row in the plurality of rows, and are routed between the input keys at intervals in the first direction;

detecting a capacitance of each of a plurality of second wiring electrodes that are arranged on the key array and are routed between the plurality of rows of the input keys; and generating a control signal including a first signal on a position of a detection target along the first direction based at least in part on the capacitances of the plurality of first wiring electrodes, the capacitances of the plurality of second wiring electrodes, and a shift amount of the input keys in each of the rows in the first direction.

13. The information processing method according to claim 12, wherein
the generating a control signal includes
determining a position of the detection target along the second direction based at least in part on the capacitances of the plurality of second wiring electrodes, and
determining the position of the detection target along the first direction by using a correction coefficient corresponding to the shift amount of the input keys, the correction coefficient being set for each position of the detection target along the second direction.

14. A sensor sheet comprising:
a sheet base material that is attached to a key array having a key layout in which a plurality of rows of input keys parallel to a first direction are arranged in a second direction orthogonal to the first direction and the input keys belonging to a first row in the plurality of rows are arranged to be shifted in the first direction with respect to the input keys belonging to a second row in the plurality of rows, and includes a plurality of holes formed to correspond to the key layout such that the input keys are individually inserted into the plurality of holes;

a plurality of wiring electrodes that are routed between the input keys at intervals in the first direction and each have a capacitance changed by a proximity of a detection target; and a connection terminal attached to the sheet base material and used for connecting the plurality of wiring electrodes to a detection circuit for detecting a capacitance of each of plurality of wiring electrodes.

* * * * *